US Patent 3,248,328
Patented Apr. 26, 1966

3,248,328
PIEZOELECTRIC CERAMIC COMPOSITION OF LEAD TITANATE AND 0.1 TO 5 MOLE PERCENT CALCIUM FLUORIDE
Tseng-ying Tien, Wilkinsburg, and William G. Carlson, Penn Hills Township, Allegheny County, Pa., assignors to Westinghouse Electric Corporation, Pittsburgh, Pa., a corporation of Pennsylvania
No Drawing. Filed Jan. 25, 1963, Ser. No. 253,985
2 Claims. (Cl. 252—62.9)

This invention relates to improvements in lead titanate ceramics and in particular concerns monolithic lead titanate ceramics characterized by improved electromechanical properties.

Lead titanate is a ferroelectric material that crystallizes with a perovskite-type structure and exhibits a Curie temperature of 490° C. The high temperature cubic modification converts to tetragonal symmetry at the ferroelectric Curie temperature. In spite of its relatively high Curie temperature, lead titanate has not been exploited as a high temperature piezoelectric material, primarily because it has not been possible to produce sound ceramics therefrom and simultaneously obtain improved electromechanical properties.

It is therefore the primary object of the present invention to provide sound ceramic materials comprising lead titanate.

It is another object of the invention to provide lead titanate ceramic structures having improved electromechanical properties.

A further object is to provide sintered monolithic ceramic bodies comprising calcium fluoride and lead titanate.

Other objects of the invention will be apparent from the following detailed description and discussion.

It has now been discovered, and it is on this discovery that the invention is in large part predicated, that monolithic lead titanate ceramic bodies can be prepared by including with the materials used to produce the lead titanate a small but effective amount of calcium fluoride. The composition thus prepared is heated in the usual fashion to produce the lead titanate and, after shaping, is sintered to a monolithic structure. Surprisingly there results sound ceramic bodies comprising lead titanate that are particularly outstanding in that they have sharply improved piezoelectric coefficients and dielectric constants.

In accordance with the present invention these new ceramic materials are prepared by intimately admixing quantities of lead oxide (PbO) and titanium dioxide ($TiO_2$) along with calcium fluoride ($CaF_2$). The calcium fluoride generally is present in an amount on the order of about 0.1 to 5 mole percent based on the lead titanate molar equivalent of the lead oxide and titanium dioxide components used. A preferred range is 0.5 to 1.5 mole percent of calcium fluoride. The materials are mixed sufficiently to secure uniformity. Then they are heated at a temperature and for a period that results in the production of the titanate from the reaction of the lead oxide and titanium dioxide. Generally this is accomplished at a temperature of about 800° to 1100° C. for a period of about a few minutes to 8 or 10 hours or more, and preferably is carried out at about 850° to 950° C. for ½ to 3 hours.

The resulting powder material suitably is ground, as in a ball mill, and then is pressed to the desired size and shape. Pressing aids in securing a compact of good density. Pressing at a pressure of about 5 to 20 tons per square inch, and preferably at about 10 tons per square inch, is adequate. The compacts are then fired in air to sinter them to monolithic bodies. This can be accomplished at a temperature on the order of 1150° to 1300° C. or more for a period of about ½ to 10 hours or more. The resulting sintered monolith is a new article of commerce, a sound lead titanate ceramic monolith.

The lead oxide, titanium dioxide and calcium fluoride used suitably are of high purity; for example the commercially available chemical pure (C.P.) or better quality material is used. For completeness of reaction as well as to prepare shapes of high density, the components are employed in a finely divided state, for example all minus 325 (Tyler) and preferably all of one micron or smaller size in diameter. It is advantageous to grind the mix together prior to the heat treatment in which the titanate is produced. Incipient fusion of particles can occur in that step. Accordingly the reaction product may be ground or ball milled prior to forming the compacts also. The addition of an inert organic liquid, e.g. acetone, aids in these operations. Other easily volatilized organic liquids can be used as well.

The sintered ceramic monoliths obtained are polarized in the usual manner to develop the electromechanical properties. Suitably this is accomplished by subjecting the compacts, after attachment of electrodes to the surfaces, to the highest D.C. field they can withstand. The level of the field varies with composition, as is apparent to the artisan, but can readily be determined by destructive preliminary tests. Of course, the polarization is carried out while the compact is suspended in an inert liquid having a high dielectric constant. A silicone oil heated to a temperature on the order of 100° C. is satisfactory. The D.C. field generally is applied for about ½ to 3 hours or more.

The invention will be described further in conjunction with the following specific example in which the details are given by way of illustration and not by way of limitation.

Compositions were prepared using equal molar proportions of titanium dioxide and lead oxide. Calcium fluoride was added to different samples of the batch in amounts of 0.1 mole percent, 0.5 mole percent and 1.0 mole percent based on the calculated moles of lead titanate to be produced from the amount of titanium oxide and lead oxide used. The calcium fluoride was added to the batches which were then mixed in an automatic mortar and pestle to which small amounts of acetone were added to facilitate mixing. After mixing, the powders were calcined at 900° C. for one hour. The calcines were ground again in a ball mill in the presence of acetone. The ground calcines were dried at 200° C. for one hour. Then disks, 1 cm. in diameter and 0.2 cm. thick, were prepared by pressing at 20,000 p.s.i. The disks were fired at 1200° C. in zirconium saggers for one hour and then permitted to cool to handling temperature.

The sintered disks were surface ground on both faces and electrodes were applied over about 80 percent of each surface by spraying silver paint through a silk screen mask. To rid the compacts of organic materials in the paint and to promote adherence, the disks were then heated at about 775° C. for one hour.

The disks were then polarized by applying the maximum D.C. field each could withstand while they were suspended in silicone oil heated to 100° C. The D.C. field was applied for 40 minutes. After polarization, the disks were aged at room temperature for 24 hours. Then the piezoelectric coefficient, $d_{33}$, was measured. This was accomplished by placing the sample between two metal plungers guided and insulated by a Teflon block. A load of 10 newtons was applied and the charge, across a shunt capacitor of 0.01 microfarad, was measured. The dielectric constant was also measured. In addition the density of sample disks was determined. The data obtained are:

| Mole Percent CaF$_2$ | A | B | C | D |
|---|---|---|---|---|
| 0.1 | 95.5 | 375 | 13.4 | 60 |
| 0.5 | 95.5 | 303 | 15.7 | 110 |
| 1.0 | 94.5 | 158 | 16.5 | 130 |

A—Density, percent theoretical.
B—Dielectric constant.
C—Field, kv./cm.
D—Piezoelectric coeff., $d_{33}$, in $10^{-12}$ coul./newton.

From these data it can be observed that with increasing calcium fluoride content the piezoelectric coefficient increases and the dielectric constant decreases. It will be observed that the dielectric constant was sharply lowered and more than a 2 fold increase in piezoelectric coefficient over the range of compositions tested was obtained. The reasons these results have been achieved are not fully understood at the present time. However it is evident that in consequence of these unique and unexpected results, this invention provides ferroelectric ceramic materials that can be used in transducers, force sensors, impact fuses and the like, all that can operate at high temperatures.

While the invention has been described with reference to specific materials and procedures, it will be apparent that variations can be made in these specific details without departing from the scope of the invention.

We claim:
1. A sound lead titanate ceramic having a low dielectric constant and a high piezoelectric coefficient, comprising calcium fluoride and the remainder lead titanate, the calcium fluoride being present in an amount of 0.1 to 5 mole percent, based on the titanate.
2. As a new article of manufacture, a monolithic ceramic body of a composition of about 0.5 to 1.5 mole percent of calcium fluoride and the remainder lead titanate.

References Cited by the Examiner
UNITED STATES PATENTS 2,377,910   6/1945   Wainer et al. _____ 106—39
2,911,370   11/1959  Kulcsar _____ 252—62.9

OTHER REFERENCES

Megaw: "Ferroelectricity in Crystals," Methuen and Co. Ltd., London, 1957, pages 108–111.

TOBIAS E. LEVOW, *Primary Examiner.*

MAURICE A. BRINDISI, *Examiner.*